US006251335B1

(12) United States Patent
Messing et al.

(10) Patent No.: US 6,251,335 B1
(45) Date of Patent: Jun. 26, 2001

(54) METHOD FOR FABRICATING TEXTURED CERAMICS

(75) Inventors: Gary L. Messing; Ender Suvaci, both of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/303,720

(22) Filed: Apr. 30, 1999

Related U.S. Application Data

(60) Provisional application No. 60/083,994, filed on May 1, 1998, and provisional application No. 60/119,335, filed on Feb. 9, 1999.

(51) Int. Cl.[7] .................................................. C04B 33/32
(52) U.S. Cl. ........................ 264/648; 264/658; 501/127
(58) Field of Search ................................... 264/648, 646, 264/658, 681; 501/127

(56) References Cited

U.S. PATENT DOCUMENTS

| 4,670,320 | * | 6/1987 | Yamaguchi et al. | .................. 428/141 |
| 5,158,916 | | 10/1992 | Nils Claussen | ....................... 501/127 |

OTHER PUBLICATIONS

"In Situ–Toughened Silicon Carbide" by Nitin P. Padture as appeared in J. Am. Ceram. Soc. 77(2), pp. 519–523 (1994).
"Microstructure Control of Silicon Nitride by Seeding with Rodlike β–Silicon Nitride Particles"; by Hirao et al.as appeared in J. Am. Ceram. Soc. 77 (7); pp. 1857–1862 (1994).
"Anisotropic Grain Growth in Seeded and $B_2O_3$–doped Diphasic Mullite Gels" by Hong et al. As appeared in J. Euro. Ceram Soc. 16 (1996), pp. 133–141.

"Texture Development by Templated Grain Growth in Liquid Phase Sintered α–Alumina"; by Seabaugh et al. As appeared in J. Am. Ceram. Soc. 80 (5); pp. 1181–1188 (1997).
"Preferred Orientation in $Al_2O_3$Substrates", by DiMarcello et al.as appeared in J. Am. Ceram Soc. vol. 55 No. 10 pp. 509–514, Oct., 1972.
"Control of Texture in Monolithic Alumina", by Brandon et al. as appeared in Mat. Science & Engin. A195 (1995); pp. 189–196.
"Obtention of Highly Dispersed Platelet–Reinforced $AL_2O_3$ Composites" by Belmonte et al. as appeared in J. of Mat. Science 29 (1994); pp. 179–183.
"Alumina Platelet Reinforced Reaction Bonded Aluminum Oxide Composites: Textured and Random" by An et al. as appeared in J. Mater. Res., vol. 12, No. 12, Dec. 1997; pp. 3300–3306.

* cited by examiner

*Primary Examiner*—Christopher A. Fiorilla
(74) *Attorney, Agent, or Firm*—Ohlandt, Greeley, Ruggiero & Perle, L.L.P.

(57) ABSTRACT

The process incorporating the invention enables fabrication of dense, highly textured (fraction of oriented grains >20 vol. %) alumina. The method uses a mixture of aluminum metal powder, alumina powder, tabular alumina grains and a liquid phase former. A dry powder mixtures of these components is compacted by dry forming techniques such as roll compaction, uniaxial pressing, forging and/or double action pressing. The formed part is then heated at 0.5–10° C./min. to a temperature between 450 and 500° C. and is held for 2–15 h, and is then heated at 1–10° C/min. to 900–1070° C. and is held for 2–10 hours to convert the aluminum particles into alumina. The part is then heated to a higher temperature (>1400° C.) to form a liquid phase which assists densification and promotes the growth of the tabular alumina grains. The aspect ratio range of the textured alumina grains is from 2–14.

12 Claims, 3 Drawing Sheets

METHOD FOR FABRICATING TEXTURED CERAMICS

This application claims benefit of provisional application No. 60/083,994 filed May 1, 1998 and provisional application No. 60/119,335 filed Feb. 9, 1999.

FIELD OF THE INVENTION

This invention relates to the fabrication of textured ceramics and, more particularly, to an improved method for such fabrication

BACKGROUND OR THE INVENTION

Textured microstructures in ceramic materials represent a significant departure from the traditional ceramics which have equiaxed grains. Many ceramic materials exhibit anisotropic characteristics in electronic and structural properties. Since traditional microstructures have random structure, traditional microstructures meet the requirements of most applications by averaging the anisotropic property characteristic of many ceramic crystal structures.

However, improved electronic and structural properties can be obtained if polycrystalline ceramics can be made to exhibit the anisotropic characteristics that are typical of single crystals. Such properties can be obtained if the polycrystalline body is textured.

Textured ceramics can be produced by a number of techniques including sinter forging and eutectic solidification. Another more general approach for producing textured ceramics is templated or seeded grain growth. Templated grain growth (TGG) is a technique for developing crystallographic texture in polycrystalline ceramic bodies via the grain growth of aligned template particles. In TGG, large, anisotropic particles are dispersed in a dense, fine-grained matrix. During heat treatment, the immediate environment of the template particle favors its growth. The template particles should grow until they impinge on one another or the matrix grain has coarsened enough to halt the template growth. If the template particles are oriented and grown, a textured microstructure should evolve.

Recent experiments in SiC (N. P. Padture et al., J. Am. Ceram. Soc., 77 [2] 519–23 (1994)), $Si_3N_4$ (K. Hirao et al., J. Am. Ceram. Soc., 77 [7] 1857–62 (1994)), mullite (S. H. Hong et al., J. Eur. Ceram. Soc., 16 133–41 (1996)), and $Al_2O_3$ (M. M. Seabaugh et al., J. Am. Ceram. Soc., 80 [5] 1181–88 (1997)) have shown oriented template particles initiate textured microstructure development.

Templates can be oriented by a variety of techniques, including tape casting, slip casting, centrifugal casting, and extrusion. In initial studies, dry forming techniques have not been used because orientation is difficult to induce during pressing of ceramic particles. Therefore, most attempts have relied on the use of colloidal processing.

Textured $\alpha$-$Al_2O_3$-based ceramics have been made by a number of techniques. Since dielectric constant anisotropy is deleterious for alumina substrates used in the microelectronics industry, texture development in commercial tape cast alumina substrates was studied extensively in the early 1970s and means were developed to avoid it (F. V. DiMarcello, J. Am. Ceram. Soc., 55 [10] 509–14 (1972)). In 1995, Brandon et al. (Mater. Sci. Eng., A195, 189–96 (1995)) oriented $\alpha$-$Al_2O_3$ platelet particles in an $\alpha$-$Al_2O_3$ matrix in an effort to reinforce the matrix with the platelet particles. The samples demonstrated improved thermal shock resistance and inhibited crack propagation in the through-thickness direction.

Belmonte et al. (J. Mater. Sci., 29 [1] 179–83 (1994)) investigated the sintering behavior of alumina 10 powder compacts containing alumina platelet particles. The $\alpha$-$Al_2O_3$ platelet particles were shown to inhibit densification. Recently, L. An et al. (J. Mater. Res., 12 [12] 3300–3306 (1997)) combined the reaction bonding of aluminum oxide process and water-based gel casting to obtain textured alumina-platelet reinforced composites. They used tape casting as the forming process with an extended doctor blade arrangement to align template particles, and hence to produce textured specimens. Their initial composition was 45 vol. % Al, 35 vol. % $\alpha$-$Al_2O_3$, and 20 vol. % $ZrO_2$. They sintered samples for 5 h at 1550° C.

The processing of textured ceramic components by approaches described in the literature are limited by high temperature (>1600° C.), colloidal-based processes and subsequent part size limitations, and limited texture.

Accordingly, it is an object of the invention to provide an improved method for the manufacture of textured ceramics.

SUMMARY OF THE INVENTION

The process incorporating the invention enables fabrication of dense, highly textured (fraction of 5 oriented grains >20 vol. %) alumina. The method uses a mixture of aluminum metal powder, alumina powder, tabular alumina grains and a liquid phase former. A dry powder mixture of these components is compacted by dry forming techniques such as roll compaction, uniaxial pressing, forging and/or double action pressing. The formed part is then heated at 0.5–10° C./min. to a temperature between 450 and 500° C. and is held for 2–15 h, and is then heated at 1–10° C./min. to 900–1070° C. and is held for 2–10 hours to convert the aluminum particles into alumina. The part is then heated to a higher temperature (>1400° C.) to form a liquid phase which assists densification and promotes the growth of the tabular alumina grains. The aspect ratio range of the textured alumina grains is from 2–14.

DETAILED DESCRIPTION OF THE PREFERRED EMBODIMENT

Figure 1:
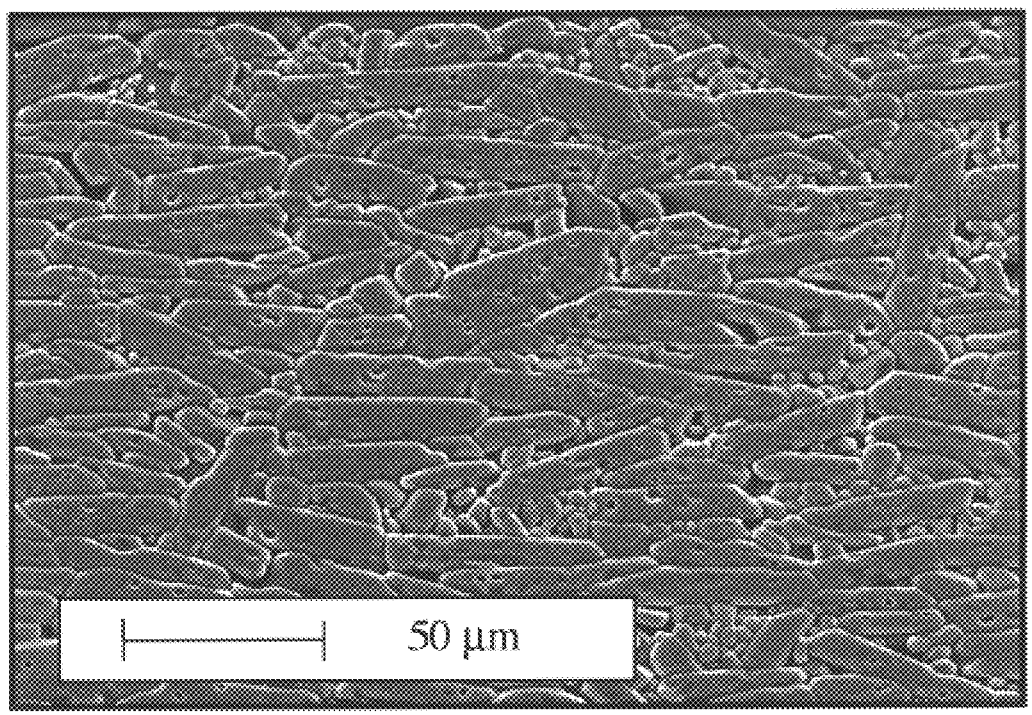
FIG. 1 is a scanning electron micrograph of 5 vol % calcium aluminosilicate glass (CAS) and 5 vol % alpha alumina platelet containing reaction bonded alumina. (Compaction pressure: 285 MPa, sintering temperature (Ts): 1600° C., sintering time (ts): 2h FIG. 2 illustrates sintering profiles of samples with and without liquid phase. (Heating rate 5° C./min., Ts: 1500° C., ts: 1 min, compaction pressure 185 Mpa)

The method of the invention enables the formation of a textured alumina ceramic. The method makes use of aluminum metal powder, commercially available alpha alumina powder, tabular alpha alumina grains (e.g., platelets) and a liquid phase former (i.e., calcium aluminosilicate glass or magnesium aluminosilicate glass). The use of ductile Al powder in the initial mixture yields attractive characteristics such as low net shrinkage, high green strength, ease of green machining, and polymer-free processing (i.e., environmentally benign).

Moreover, when alpha alumina platelet particles are added to the initial mixture, ductile Al allows control of orientation during dry forming operations e.g., roll compaction, uniaxial pressing and/or double action pressing). In addition, when Al is converted to alumina upon heating in air, a fine-grained alumina matrix results which provides a high driving force for grain growth of the oriented particles. Accordingly, a textured microstructure is developed by the growth of aligned platelet particles in a dense and fine grain size matrix.

Initially added and aligned platelet grains grow at the expense of fine alpha alumina matrix and since they carry their initial alignment to the final microstructure, the final microstructure exhibits a textured character. Therefore, the addition of the alpha alumina platelet particles into the initial powder mixture and the alignment of them during the dry forming process are critical in the obtaining of a textured ceramic.

If intimate contact between large alpha alumina platelets and fine alpha alumina matrix grains is not satisfied, the platelet growth is not observed. Therefore, liquid phase former(s) are used in this process. When the sample is heated to >~1300° C., the liquid phase formation is observed due to melting of glass phase (i.e., liquid phase former). The liquid phase assists densification, reduces the sintering temperature and promotes the growth of tabular alpha alumina grains.

The method of the invention is a relatively low cost process for fabricating highly textured alumina and uses a mixture of Al metal powder, alumina powder, tabular alumina grains and a liquid phase former. Dry powder mixtures of these components are compacted by techniques such as roll compaction, uniaxial pressing, forging or double action pressing. The formed part is then heated to convert the aluminum particles into alumina, and to a higher temperature to form a liquid phase which can assist densification and promotes the growth of the tabular alumina grains. During this higher temperature processing, a highly textured product results as a consequence of the grain growth process.

The process begins by mixing 30–60 vol. % milled Al (particle size<1 $\mu$m, SSA>17 m$^2$/g), 30–60 vol. % alpha alumina (particle size ~0.2 $\mu$m) and 0.1–20 vol. % liquid phase former (e.g., calcium aluminosilicate, or magnesium aluminosilicate) in a ball mill with an appropriate volume of a suitable solvent for 1–10 h. After ball milling, alpha alumina template particles (i.e., tabular alumina grains) with an aspect ratio >1 are added in the amount of 0.1–25 vol. % of the powder mixture to the dipersion and or slurry (here-in after solvent).

The slurry is mixed for 24 h. During this mixing period, the slurry is sonicated. Isopropanol, ethanol, or other organic solvents are used as a medium during the mixing process. The slurry is dried in an oven (at ~80° C.) for 24 h. Dried powders are sieved to <90 $\mu$m (−170 mesh). Samples are prepared from the powder by use of different metal forming techniques such as dry pressing, forging, roll compaction or double action pressing. During forming, a compaction pressure in the range of 10 to 900 MPa is applied to the powder.

After forming, samples are oxidized by heating at 5–10° C./min. from room temperature to 450° C., then at 0.5–2° C./min. from 450 to 1070° C. and 3–10 h dwell at 1070° C. in a box furnace in an oxygen containing atmosphere (i.e., generally in air). For larger samples the heat treatment process should be more gradual. In such case, the formed part is heated at 0.5–10° C./min. to a temperature between 450 and 500° C. and is held for 2–15 h, and is then heated at 1–10° C./min. to a temperature between about 900° C. to about 1100° C. and preferably from 900–1070° C. and is held for 2–10 hours. This converts the aluminum particles into alumina.

At the end of the oxidation stage, all the aluminum is converted to aluminum oxide. The samples are heated at 5–10° C./min. to the sintering temperature (i.e., temperature in excess of 1400° C. or preferably 1300–1700° C.) and held for 1–1440 min.

To illustrate the invention without limiting it, the following examples are provided.

EXAMPLE I

A mixture is prepared with 2.8 g Al (SSA~20 m$^2$/g), 3.9 g $\alpha$-Al$_2$O$_3$ (~0.2 $\mu$m), and 0.3 g calcium aluminosilicate (CAS) liquid phase former (~1 $\mu$m). The mixture is ball milled for 5 h with 30 ml 99% pure $\alpha$-Al$_2$O$_3$ balls (3/16" diameter) in 40 ml isopropanol in a 60 ml plastic bottle. For the initial mixture, fine flaky Al particles are prepared by attrition milling spherical Al particles (2–5 $\mu$m) with first 5 mm yttria stabilized tetragonal ZrO$_2$ (YTZ) balls for 12 h then 1 mm YTZ balls for 8 h at 600 rpm.

The CAS liquid phase former is prepared by melting a glass with a composition of 42.4 wt. % SiO$_2$, 19.9 wt. % $\alpha$-Al$_2$O$_3$, and 37.6 wt. % CaO at 1600° C. for 2 h and quenching it in cold water. The glass is crushed in a mortar, and sized to 0.2–3 $\mu$m by ball milling for 24–48 h with 3/16" diameter high purity $\alpha$-Al$_2$O$_3$ balls. After ball milling, 0.5 g alpha alumina platelets of 15–25 $\mu$m diameter are added to the slurry.

The platelets are washed prior to the mixing by adding 40 g templates to 360 g water. The pH is adjusted to 1.0 with 7 wt. % nitric acid solution. After sonication the slurry is boiled for 1 h. The templates are separated and washing three more times before adding them to the slurry.

After the addition of the platelets, the slurry is mixed for 24 h. The slurry is dried in an oven at 80° C. for 24 h. The dried powder is sieved to <90 $\mu$m (−170 mesh). 0.3 g of the powder mixture is uniaxially pressed under 8,000 lbs. in a half inch die (i.e., ~285 MPa). After pressing, pellet samples are oxidized in a box furnace by heating from room temperature at 5° C./min to 450° C., then at 1° C./min. from 450 to 1070° C. and 5 h dwell at 1070° C. in an oxygen containing atmosphere (i.e., generally in air). At the end of the oxidation stage, all of the aluminum is converted to aluminum oxide. After oxidation, samples are heated at 5° C./min. to 1600° C. and held for 120 min. As shown in FIG. 1, the final microstructure is dense (~94% TD) and is highly textured (~75 vol. % based on stereological analysis).

EXAMPLES II TO VII

The examples that follow enable an understanding of the effect of initial compaction ratio (i.e., ratio of initial height of the powder compact to final height of the powder compact) on the final degree of orientation.

The tests are carried out in a uniaxial press by using 6 different compaction pressures. These pressure values are 36, 107, 178, 285, 321, 576 MPa. The corresponding compaction ratios are 3.85, 4.76, 5.55, 6.67, 7.14, 7.69, respectively. The samples are oxidized and sintered at 1600° C. for 2 h. After sintering, samples exhibited different degrees of orientation. The results are reported in Table I below.

Table I shows that increasing the strain (i.e., increasing the compaction ratio) during the forming stage increases the degree of orientation of the microstructure. Consequently, the degree of orientation of a final microstructure can be controlled during the consolidation process.

TABLE I

| Example # | Compaction Pressure (MPa) | Compaction Ratio | Orientation Parameter, "r"* |
|---|---|---|---|
| II | 36 | 3.85 | 0.45 |
| III | 107 | 4.76 | 0.44 |
| IV | 178 | 5.55 | 0.42 |
| V | 285 | 6.67 | 0.39 |
| VI | 321 | 7.14 | 0.38 |
| VII | 576 | 7.69 | 0.37 |

(*r value calculated based on rocking curve analysis and for random materials r is 1 and for textured materials r is less than 1.)

EXAMPLE VIII

Figure 2:
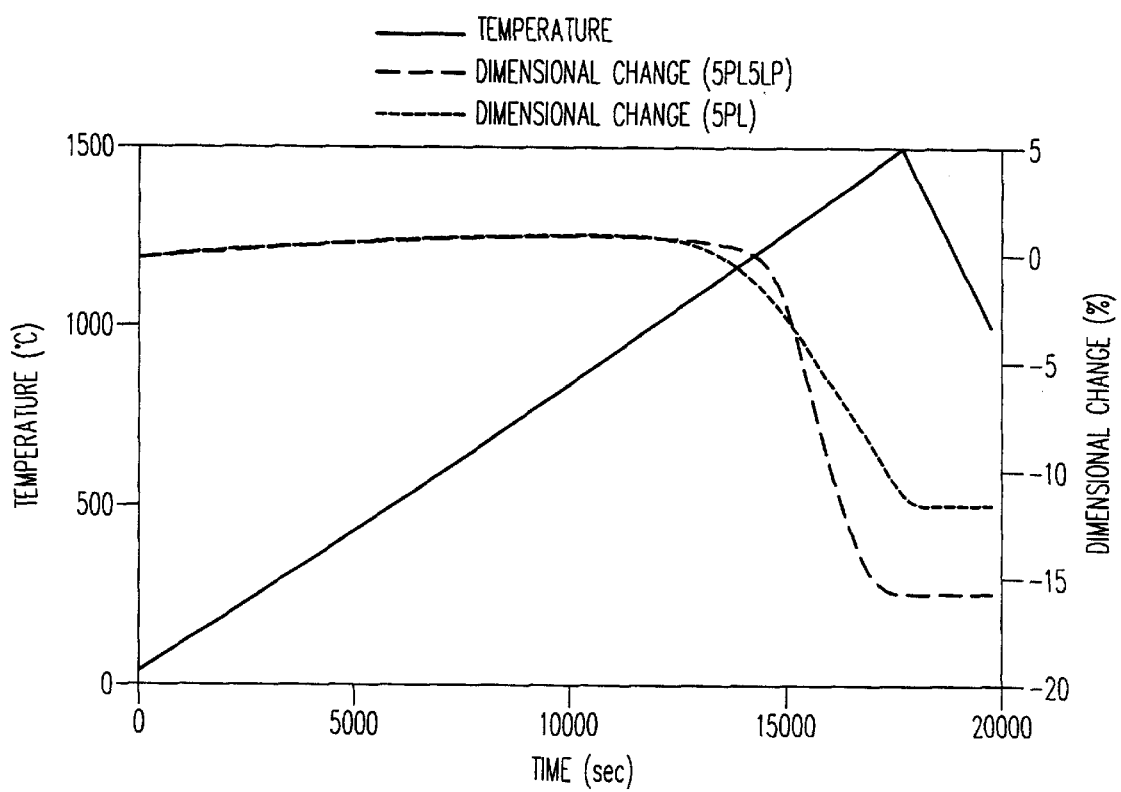

The effect of liquid phase former (in this example CAS) on sintering temperature of platelet containing samples is tested by means of a thermomechanical analyzer. The fully oxidized samples are heated at 5° C./min to 1500° C. The results are reported in FIG. 2.

The liquid phase containing sample (SPL5LP=5 vol % $\alpha$-$Al_2O_3$ platelets and 5 vol % CAS) exhibits a lower sintering temperature (i.e., $\alpha$1450° C.) than the sample without a liquid phase former (5PL =5 vol % $\alpha$-$Al_2O_3$ platelets and no CAS) (i.e., >1500° C.). Hence, liquid phase former addition to the initial Al+a-$Al_2O_3$ makes the sintering of reaction bonded alumina ceramics possible at low temperatures.

EXAMPLES IX AND X

Figure 3:
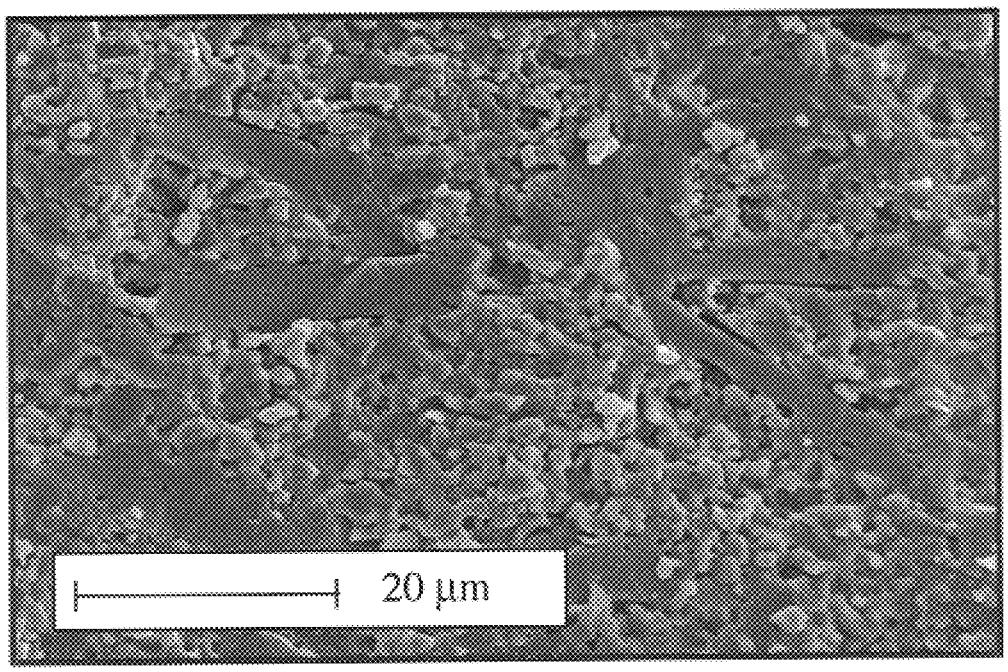
FIG. 3 is a scanning electron micrograph of a sample wherein no liquid phase former was incorporated into the ceramic mixture.
Figure 4:
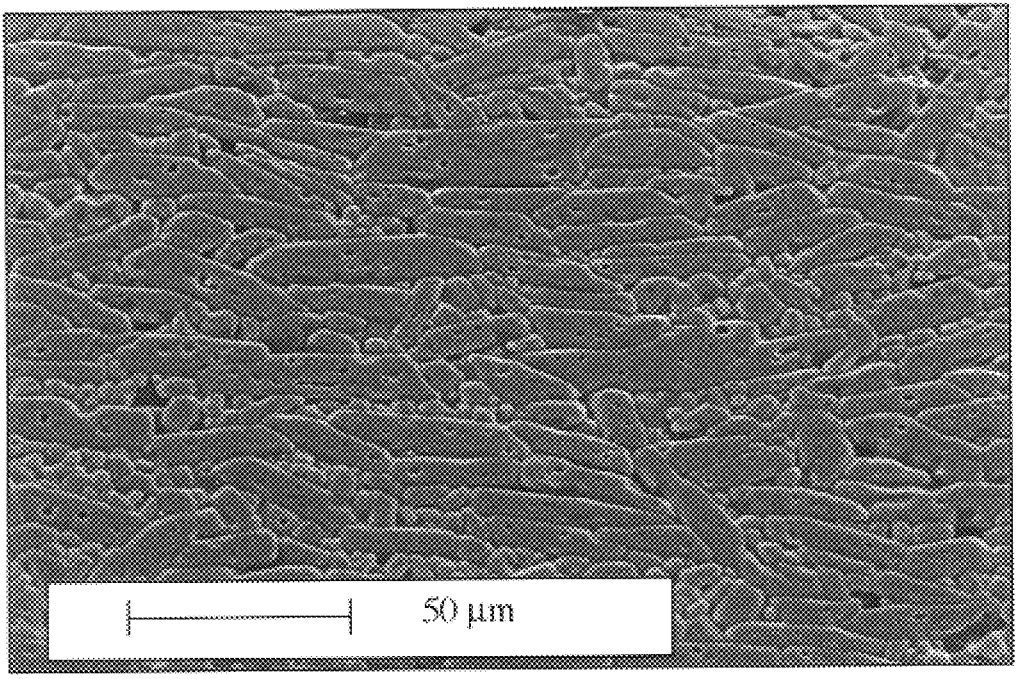
FIG. 4 is a scanning electron micrograph of a sample wherein a liquid phase former (e.g., CAS) was incorporated into the ceramic mixture.

The effect of a liquid phase former (in this example CAS) on the final microstructure of platelet containing samples is tested. The final microstructures of platelet-containing samples with and without any liquid phase former are compared. These samples are sintered at 1600° C. for 2 h. The results are shown in FIGS. 3 and 4.

Addition of a liquid phase former to the initial Al+ $\alpha$-$Al_2O_3$ mixture changes the microstructure features of reaction bonded alumina ceramics. In addition, the liquid phase former accelerates grain growth during the process.

EXAMPLES XI TO XIV

The examples that follow appraise the effect of sintering temperature on texture development during the sintering of CAS and platelet containing (5 vol. % each) Al+ $\alpha$-$Al_2O_3$ samples. The results are reported in Table II.

TABLE II

| Example # | Sintering Temperature (° C.) | Sintering time (min) | Fraction of material which is oriented, "f"* (vol. %) | Orientation Parameter, "r"** |
|---|---|---|---|---|
| XI | 1400 | 120 | 5–9 | 0.62 |
| XII | 1500 | 120 | 28.5–32 | 0.36 |
| XIII | 1600 | 120 | 70–80 | 0.40 |
| XIV | 1650 | 120 | >70 | 0.40 |

EXAMPLES XV TO XIX

The examples that follow evaluate the effect of sintering time on texture development during the sintering of CAS and platelet containing (5 vol. % each) Al+ $\alpha$-$Al_2O_3$ samples. The results are given in Table III.

TABLE III

| Example # | Sintering Temperature (° C.) | Sintering Time (min.) | Fraction of material which is oriented, "f"* (vol. %) | Orientation Parameter, "r"** |
|---|---|---|---|---|
| XV | 1600 | 1 | 43–49 | 0.58 |
| XVI | 1600 | 30 | 55–60 | 0.37 |
| XVII | 1600 | 60 | 55–65 | .39 |
| XVIII | 1600 | 120 | 70–80 | 0.40 |
| XIX | 1600 | 300 | >70 | 0.41 |

*"f" values measured by stereological analysis.
**"r" values measured by x-ray based rocking curve analysis.

EXAMPLES XX TO XXIII

The examples that follow make it possible to appraise the effect of sintering temperature on the aspect ratio of the oriented grains. The results are reported in Table IV.

TABLE IV

| Example # | Sintering Temperature (° C.) | Sintering Time (min) | Aspect Ratio of Anisotropic Grains* |
|---|---|---|---|
| XX | 1400 | 120 | 11.0–12.3 |
| XXI | 1500 | 120 | 6.9–8.5 |
| XXII | 1600 | 120 | 5.0–6.0 |
| XXIII | 1650 | 120 | 4.2–5.0 |

(*Aspect ratio of anisotropic grains were measured by stereological analysis method.)

EXAMPLES XXIV TO XXVI

The examples that follow appraise the effect of liquid phase content (i.e., calcium aluminosilicate, CAS, glass content) on texture development (i.e., textured volume fraction, f, degree of orientation, r, and aspect ratio) during the sintering of 5 vol % platelet containing Al+ $\alpha$-$Al_2O_3$ samples. All samples are sintered at 1600° C. for 2 h. The results are reported in Table V.

TABLE V

| Example # | Liquid phase content in the initial mixture (vol. %) | Fraction of material which is oriented, "f"* (vol. %) | Orientation Parameter, "r"** | Aspect Ratio |
|---|---|---|---|---|
| XXIV | 1 | 60–70 | 0.42–0.45 | 3.6–4.2 |
| XXV | 5 | 90–100 | 0.39–0.41 | 5.4–5.5 |
| XXVI | 10 | 70–80 | 0.39–0.41 | 5.4–5.5 |

EXAMPLES XXVII TO XXIX

The examples that follow evaluate the effect of initial template size on texture development during the sintering of CAS and platelet containing (5 vol. % each) Al+ $\alpha$-$Al_2O_3$ samples. All samples are sintered at 1600° C. for 2 h. The results are reported in Table VI.

TABLE VI

| Example # | Initial alpha alumina template size (micrometers) | Fraction of material which is oriented, "f"* (vol. %) | Orientation Parameter, "r"** | Aspect Ratio |
|---|---|---|---|---|
| XXVII | 5–10 | 40–45 | 0.43–0.45 | 3.0–3.1 |
| XXVIII | 10–15 | 50–60 | 0.42–0.44 | 3.2–3.9 |
| XXIX | 15–25 | 90–100 | 0.39–0.41 | 5.4–5.5 |

EXAMPLES XXX TO XXXII

The examples that follow evaluate the effect of initial template content on texture development during the sintering of 5 vol. % CAS containing Al+ α-Al$_2$O$_3$ samples. All samples are sintered at 1600° C. for 2 h. The results are reported in Table VII.

TABLE VII

| Example # | Initial alpha alumina template content (vol. %) | Fraction of material which is oriented, "f"* (vol. %) | Orientation Parameter, "r"** | Aspect Ratio of anisotropic grains*** |
|---|---|---|---|---|
| XXX | 1 | 80–85 | 0.47–0.49 | 5.0–5.2 |
| XXXI | 5 | 90–100 | 0.39–0.41 | 5.4–5.5 |

EXAMPLES XXXIII TO XXXV

The examples that follow evaluate the effect of textured microstructure on fracture toughness of alumina ceramics after the sintering process. Textured samples are produced from 5 vol. % CAS and 5 vol. % platelet containing Al+ α-Al$_2$O$_3$ samples. All samples are sintered at 1600° C. for 2 h. The results are reported in Table VIII.

TABLE VIII

| Example # | Sample Description | Fracture toughness**** (MPa · m$^{1/2}$) |
|---|---|---|
| XXXIII | Random- 5 vol % CAS (no platelet) | 4.64 ± 0.17 |
| XXXIV | Textured-Platelets aligned normal to the plane of flexure | 6.02 ± 0.46 |
| XXXV | Textured-Platelets aligned parallel to the plane of flexure | 6.85 ± 0.32 |

*"f" values measured by stereological analysis.
**"r" values measured by x-ray based rocking curve analysis.
***Aspect ratio of anisotropic grains were measured by stereological analysis method.
****All the fracture toughness measurements were performed through the thickness of the specimen in four-point bending, on samples notched with a Vickers indenter.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for fabrication of highly textured alumina, said method comprising the steps of:

a) providing a mixture of aluminum metal powder, alumina powder, tabular alumina grains and a liquid phase former;

b) compacting said mixture to create a compacted mixture;

c) heating said compacted mixture in an oxygen containing atmosphere to a temperature between about 900° C. and about 1100° C. for about 2–10 hours to convert the aluminum metal in said compacted mixture of step (b) into alumina;

d) further heating said compacted mixture to a temperature in excess of 1400° C. to form a liquid phase which assists densification and promotes growth of the tabular alumina grains.

2. The method of claim 1 wherein step b) compacts said mixture to at least a compaction ratio of at least 3, wherein said compaction ratio is a ratio of initial height of the mixture to a final height of the compacted mixture.

3. The process of claim 1, wherein step c) heats said mixture at a rate of about 0.5–10° C./min to said temperature between about 900° C. and about 1100° C.

4. The process of claim 1, wherein step c) first heats said compacted mixture at a rate of 0.5–10° C./min. to a temperature between 450 and 500° C. and holds said compacted mixture at said temperature for 2–15 h, and then heats said compacted mixture for said 0.5–10° C./min. to about 900 to about 1100° C.

5. The process of claim 1 wherein step d) heats said compacted mixture at a rate of 1–10° C./min. to a temperature >1400° C. and holds said temperature for 1–500 min.

6. The process of claim 1 which involves the use of a liquid phase former with a composition of 42.4 wt. % SiO$_2$, 19.9 wt. % α-Al$_2$O$_3$, and 37.6 wt. % CaO, resulting in 0.1–25 vol. % liquid in said mixture during heating.

7. The method as recited in claim 1, wherein step b) compacts said mixture through use of a dry forming compaction technique.

8. The method as recited in claim 1, wherein step a) uses tabular alumina particles having an aspect ratio larger than 1 in said mixture.

9. The method as recited in claim 1, wherein step a) employs >0.1 vol. % of tabular alumina particles in said mixture.

10. The method as recited in claim 1, wherein step a) employs 30–60 vol. of aluminum particles in said mixture.

11. The method as recited in claim 1 wherein step a) employs 30–60 vol. % of α-Al$_2$O$_3$ powder in said mixture.

12. The method as recited in claim 1 wherein step a) employs a liquid phase former selected from: calcium aluminosilicate or magnesium aluminosilicate.

* * * * *